(12) United States Patent
Brunnenmeyer

(10) Patent No.: US 8,614,945 B2
(45) Date of Patent: Dec. 24, 2013

(54) DYNAMIC SERVICE LEVEL ALLOCATION SYSTEM AND METHOD

(75) Inventor: David J. Brunnenmeyer, Rolling Hills Estate, CA (US)

(73) Assignee: The Boeing Company, Chicago, IL (US)

(*) Notice: Subject to any disclaimer, the term of this patent is extended or adjusted under 35 U.S.C. 154(b) by 24 days.

(21) Appl. No.: 13/327,750

(22) Filed: Dec. 15, 2011

(65) Prior Publication Data

US 2013/0155961 A1   Jun. 20, 2013

(51) Int. Cl.
*H04L 12/26* (2006.01)
*H04L 12/28* (2006.01)

(52) U.S. Cl.
USPC .................................. 370/230; 370/395.21

(58) Field of Classification Search
USPC .................. 370/230–235, 392.2, 395.21, 401
See application file for complete search history.

(56) References Cited

U.S. PATENT DOCUMENTS

| | | | |
|---|---|---|---|
| 5,699,355 A * | 12/1997 | Natarajan | 370/322 |
| 7,652,989 B2 * | 1/2010 | Yang et al. | 370/230 |
| 7,756,989 B2 * | 7/2010 | Goldszmidt et al. | 709/229 |
| 7,852,849 B2 * | 12/2010 | Davidson et al. | 370/395.21 |
| 7,853,265 B1 * | 12/2010 | Ahmad | 455/453 |
| 8,149,771 B2 * | 4/2012 | Khivesara et al. | 370/329 |
| 2004/0033806 A1 | 2/2004 | Daniel | |
| 2005/0002335 A1 * | 1/2005 | Adamczyk et al. | 370/230 |
| 2010/0020685 A1 * | 1/2010 | Short et al. | 370/230 |

FOREIGN PATENT DOCUMENTS

| | | |
|---|---|---|
| EP | 0719062 A2 | 6/1996 |
| GB | 2306859 A | 5/1997 |

* cited by examiner

*Primary Examiner* — Hong Cho
(74) *Attorney, Agent, or Firm* — Klintworth & Rozenblat IP LLC

(57) ABSTRACT

A dynamic service level allocation system and method is disclosed in which a host, who has been allocated a bandwidth in which it can communicate with a satellite, shares this bandwidth with a user at the intermediate frequency level. The system includes a control module and a synchronization module that interact with the network operation center (NOC) of the host to adjust bandwidth and service level requirements of the host and user so that the bandwidth required by the user can be granted while maintaining the service level required by the host. The allocation of bandwidth between the user and host is done dynamically to accommodate the changing requirements of the user and the host.

30 Claims, 5 Drawing Sheets

DYNAMIC SERVICE LEVEL ALLOCATION SYSTEM AND METHOD

BACKGROUND

In traditional satellite systems, the beam produced by the satellite is shared by multiple users who are allocated a separate bandwidth within the beam. This allocation has been accomplished on a frequency division multiple access ("FDMA") basis or by the satellite transponder. However, these allocation methods are generally static. Thus, any bandwidth not used by a user is wasted. This issue arises in both single and multibeam satellite systems.

SUMMARY

A system for dynamically allocating bandwidth in a satellite communication system (a "dynamic service level allocation system" or "DSLAS") is disclosed. In this system, bandwidth is shared between entities at the intermediate frequency level and in such a manner that the allocation can change with the varying requirements of the host and the user.

The DSLAS includes a system and method in which the host, who has been allocated a bandwidth in which it can communicate with a satellite, shares the host's unused bandwidth with a user according to parameters agreed upon by the host and user ("user service level parameters"). The host and user each access the satellite via their own modem, network management system ("NMS") and network operations center ("NOC"). The DSLAS includes a control module, a synchronization module, a host NOC interface and a user NOC interface. It may further include a user NOC, host NOC, user modem and host modem.

The control module generates a request by the user for access to the satellite that generally includes a required bandwidth (a "user service level request"). The synchronization module includes an allocation module that receives this user service level request and communicates a request to the host NOC to instruct the host modem to reduce the host bandwidth by an amount equal to the bandwidth required by the user. Communication between the synchronization module and the host NOC is facilitated by the host NOC interface.

The NOC determines whether there is sufficient bandwidth to satisfy the service level required by the host and that required by the user. It does this by determining the service level required by the host and whether that service level can be maintained if the host bandwidth is reduced by the amount required by the user. The service level required by the host is set forth in host service level parameters.

If the host NOC determines that the host service level cannot be maintained if the request to reduce the host bandwidth is granted, the NOC communicates this to a negotiation module in the synchronization module that adjusts the service level requested by the user and/or the service level required by the host according to the user and/or host service level parameters.

If the host NOC determines that the host service level can be maintained if the request to reduce the host bandwidth is granted, the NOC communicates this to the allocation module. The allocation module then instructs the user NOC, via the user NOC interface, to instruct the user modem to provide the user with the bandwidth required by the user and the host NOC to instruct the host modem to reduce the bandwidth provided to the host.

In addition, the negotiation module may adjust the service level required by the host and/or user when the host and/or user NOC determine that the interference in the host and/or user bandwidth exceeds service level parameters.

In addition, the negotiation module may adjust the service level required by the host and/or user when the host and/or user NOC determine that a quality of service ("QoS") in the host and/or user bandwidth falls outside service level parameters.

The DSLAS may also include a user billing module for determining the cost to the user for the services provided to the user by the host.

The DSLAS may be implemented in a multibeam satellite system in which it allocates bandwidth to the user on a cell-by-cell basis.

BRIEF DESCRIPTION OF THE DRAWINGS

The invention can be better understood with reference to the following drawings and description. The components in the figures are not necessarily to scale, emphasis instead being placed upon illustrating the principles of the invention.

DETAILED DESCRIPTION

Figure 1:
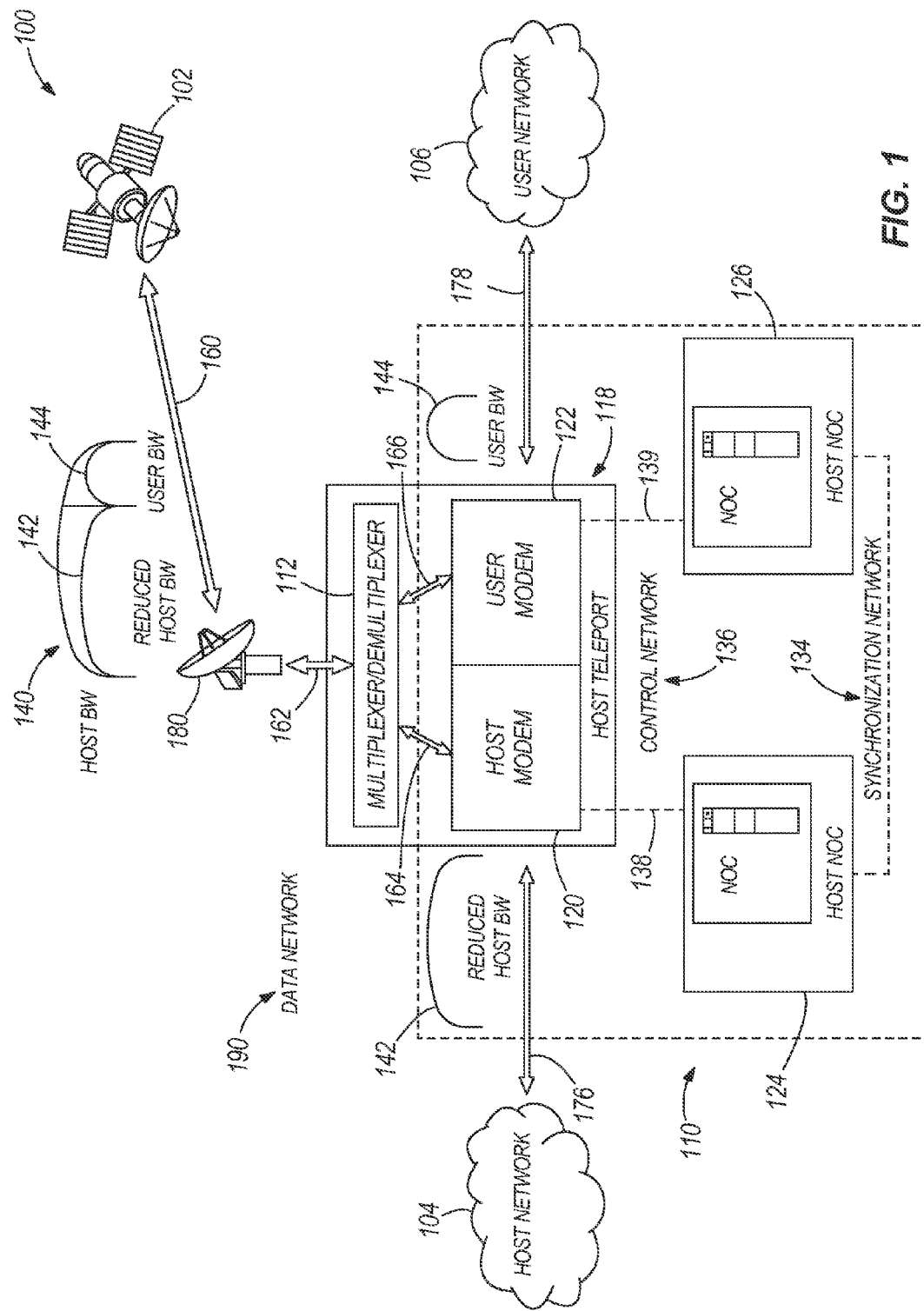
FIG. 1 is a simplified diagram of an example of a dynamic service level allocation system architecture as implemented in a satellite communication system.

FIG. 1 shows an example of a satellite communications system 100 including a satellite 102, an antenna 180, a host teleport 118, a dynamic service level allocation system ("DSLAS") 110, a host network 104, a user network 106 and a data network 190. The DSLAS 110 includes a host modem 120 and a user modem 122.

The host teleport 118 is a satellite ground system that functions as a hub connecting a satellite network with terrestrial telecommunication systems. The host teleport 118 is generally controlled by the operator and/or owner of the satellite 102 or by another entity on behalf of the operator and/or owner of the satellite 102 (collectively the "host"). The host has a specific bandwidth 140 over which the host teleport 118 may communicate with the satellite 102. The host provides access to the satellite through the host modem 120 by assigning, selling or leasing blocks of the host bandwidth 140 to providers and end users of satellite services, and/or distributers who resell the blocks of the host bandwidth 140 (collectively "host customers"). At times, the bandwidth required by the host to provide services to the host customers 142 may not require all the bandwidth allocated to the host 140. When the host bandwidth 140 has excess capacity, the host may assign, sell or lease this excess capacity to one or more entities that desire communication with the satellite 102 via the host modem 122. Like the host, these entities provide access to the satellite 102 to providers and end users of satellite services, distributers and/or themselves (each a "user," collectively "users"). The host provides host customers access to the satellite 102 via the host network 104 and the user provides user access to the satellite 102 via the user network, 106.

The host network 104 and user network 106 may include a collection of software and hardware. The hardware may include computers and/or devices capable of data processing and/or transmission, which are interconnected via electromagnetic communications over electromagnetic channels that allow sharing of resources and information. These networks 104, 106 may include a combination of wired and wireless technologies, protocols and technologies.

In this example, the host modem 120 and user modem 122 are implemented in the host teleport 118. The host and the user access to the satellite 160 via the host modem 120 and the user modem 122, respectively. Using this configuration, communications between the host network 104 and the satellite 102 are segregated from the communications between the user network 106 and the satellite 102 at the intermediate frequency ("IF") level.

The DSLAS 110 also includes a synchronization network 134 and a control network 136, which control the flow of data over the data network 190 throughout the system 100. The DSLAS 110 also includes a host network operation center ("NOC") 124 and a user NOC 126. As used herein, the term "NOC" refers to the software and hardware used to monitor a network, including monitoring, identifying, diagnosing, isolating and/or correcting faults and/or performance failures in the network. As used herein, the term "NOC," unless specifically stated, does not refer to the physical location or locations in which these devices are located and the functions are carried out.

The host NOC 124 performs network monitoring and control of the host modem 120. For example, the host NOC 124 controls the bandwidth provided by the host modem 120 via host control network 138 as instructed by the synchronization network 134. Similarly, the user NOC 126 controls the bandwidth provided by the user modem 122 via the user control network 139. The synchronization network 134 is an overlay to the host 124 and user 126 NOCs. In general, the synchronization network 134 synchronizes the operation of the user and host NOCs 124, 126 so that bandwidth is provided in a manner that satisfies the dynamic service level requirements of the host network 104 and user network 106. The service level required by the host network 104 may include the bandwidth and the quality of service ("QoS") required by the host network 104. The service level required by the user network 106 may include the bandwidth and the QoS required by the user network 106. The QoS levels may include minimum data rate, packet loss rate, jitter and latency. In general, the synchronization network 134 allocates bandwidth to the user network 106 when such allocation enables the service level required by the host network 104 to be maintained.

The synchronization network 134, control network 136 and the host NOC 124 work together to determine when there is sufficient bandwidth to satisfy the service level requirements of both networks 104, 106 and, if necessary, adjust the service level requirements of the host network 104 and/or the user network 106 in an attempt to create sufficient bandwidth. When there is sufficient bandwidth to satisfy the service level requirements of both networks 104, 106, the host NOC 124 instructs the host modem 120, via host control network 138, to reduce the bandwidth allocated to the host 140 by the bandwidth required by the user network 106 (thus producing a "reduced host bandwidth" 142) and assigns the bandwidth required by the user (the "user bandwidth" 144) to the user network 106. Such bandwidth allocation is performed dynamically, over time, to accommodate the changing service level requirements of the user network 106 and the host network 104.

The data network 190 enables the flow of data throughout the system 100 as determined by the synchronization network 134 and the control network 136. The data network 190 includes a plurality of electromagnetic signals. These signals are of various frequencies and bandwidths and may be communicated by wireless and/or wireless techniques. These signals include an RF signal 160, an IF signal, a host IF signal 164, a user IF signal 166, a baseband reduced host signal 176 and a baseband user signal 178.

As data flows from the satellite 102 to the antenna 180, it does so via an RF signal 160. The RF signal 160 is an electromagnetic signal having a bandwidth equal to the host bandwidth 140 and is generally in the radio frequency ("RF") range. For example, the RF signal 160 may be in the L-band (500-1500 MHz), C-band (3600-7025 MHz), Ku-band (10.7-14.5 GHz) or Ka-band (17.3-31 GHz). The antenna 180 downconverts the RF signal 160 to an intermediate frequency (IF), such as L-band, to produce the IF signal 162. The IF signal 162 has a bandwidth equal to the host bandwidth 140. By use of a multiplexer/demultiplexer 112, the IF signal 162 is split into a host IF signal 164 and a user IF signal 166, each with a bandwidth equal to the host bandwidth 140.

The host modem 120 receives the host IF signal 164 and isolates the reduced host bandwidth 142, to produce a signal with the reduced host bandwidth 142 at a baseband frequency (the "baseband reduced host signal" 176). The user modem 122 receives the user IF signal 166 and isolates the user bandwidth 144 to produce a signal with the user bandwidth 144 at the baseband frequency (the "baseband user signal" 178). When the data flows from the host network 104 and user network 106 to the satellite 102, it does so over virtually the same path but in reverse.

Figure 2:
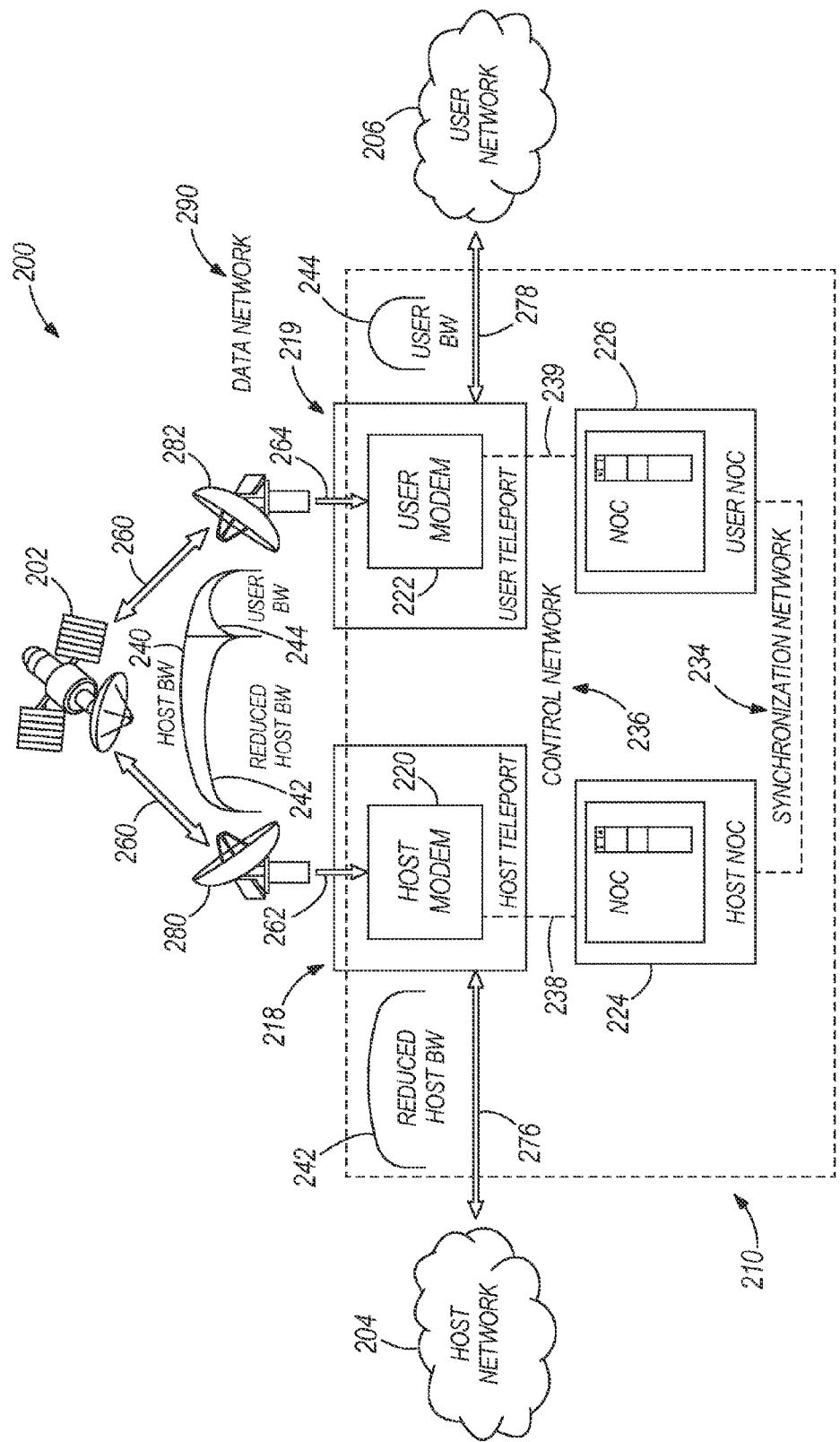
FIG. 2 is a simplified diagram of another example of a dynamic service level allocation system architecture as implemented in a satellite communication system.

FIG. 2 shows another example of a satellite communications system 200. This system 200 includes a satellite 202, a host antenna 280, a host teleport 218, a user antenna 282, a user teleport 219, an DSLAS 210, a host network 204 and a user network 206.

The DSLAS 210 includes a host modem 220 and a user modem 222. In this example, the host modem 220 is implemented in the host teleport 218 and the user modem 222 is implemented in the user teleport 219. With the host modem 220 and user modem 222 implemented on two separate teleports 218, 219, respectively, communications between the host network 204 and the satellite 202 are segregated from the communications between the user network 206 and the satellite 202 at the IF level.

The DSLAS 210 also includes a control network 236 and a synchronization network 234, which control the flow of data over the data network 290 throughout the system 200. The DSLAS 210 also includes a host NOC 224 and a user NOC 226. The host NOC 224 controls the bandwidth provided by the host modem 220 via a host control network 238 as instructed by the synchronization network 234. Similarly, the user NOC 226 controls the bandwidth provided by the user modem 222 via the user control network 239 as instructed by the synchronization network. The synchronization network 234 is an overlay to the host 224 and user 226 NOCs. In general, the synchronization network 234 synchronizes the operation of the user and host NOCs 224, 226 so that bandwidth is provided in a manner that satisfies the service level requirements of the host network 204 and user network 206. In general, the synchronization network 234 allocates bandwidth to the user network 206 when such allocation enables the service level required by the host network 204 to be maintained.

The synchronization network 234 and the host NOC 224 work together to determine when there is sufficient bandwidth to satisfy the service level requirements of both networks 204, 206 and, if necessary, adjust the service level requirements of the host network 204 and/or the user network 206 in an attempt to create sufficient bandwidth. When there is sufficient bandwidth to satisfy the service level requirements of both networks 204, 206, the host NOC 224 instructs the host modem 220, via control line 238, to reduce the bandwidth allocated to the host 240 by the bandwidth required by the user network 206 (thus producing a "reduced host bandwidth" 242) and assigns the bandwidth required by the user (the "user bandwidth" 244) to the user network 206. Such bandwidth allocation is performed dynamically, over time, to accommodate the changing service level requirements of the user network 206 and the host network 204.

The data network 290 enables the flow of data throughout the system 200 as determined by the synchronization network 234 and the control network 236. The data network 290 includes a plurality of electromagnetic signals of various frequencies and bandwidths. These signals include an RF signal 260, a host IF signal 262, a user IF signal 264, a baseband reduced host signal 276 and a baseband user signal 278.

As data flows from the satellite 202 to the host antenna 280 and the user antenna 282, it does so via RF signal 260. The RF signal 260 is an electromagnetic signal having a bandwidth equal to the host bandwidth 240 and is generally in the radio frequency (RF) range, for example L-band, C-band, Ku-band, or Ka-band. Each antenna 280, 282 downconverts the RF signal 260 to an IF, such as L-band, to produce a host IF signal 262 and a user IF signal 264, respectively. The host and user IF signals 262, 264, respectively, each have a bandwidth equal to the host bandwidth 240.

The host modem 220 receives the host IF signal 262 and isolates the reduced host bandwidth 242, to produce a signal with the reduced host bandwidth 242 at a baseband frequency (the "baseband reduced host signal" 276). The user modem 222 receives the user IF signal 264 and isolates the user bandwidth 244 to produce a signal with the user bandwidth 244 at the baseband frequency (the "baseband user signal" 278). When the data flows from the host network 204 and user network 206 to the satellite 202, it does so over virtually the same path but in reverse.

Figure 3:
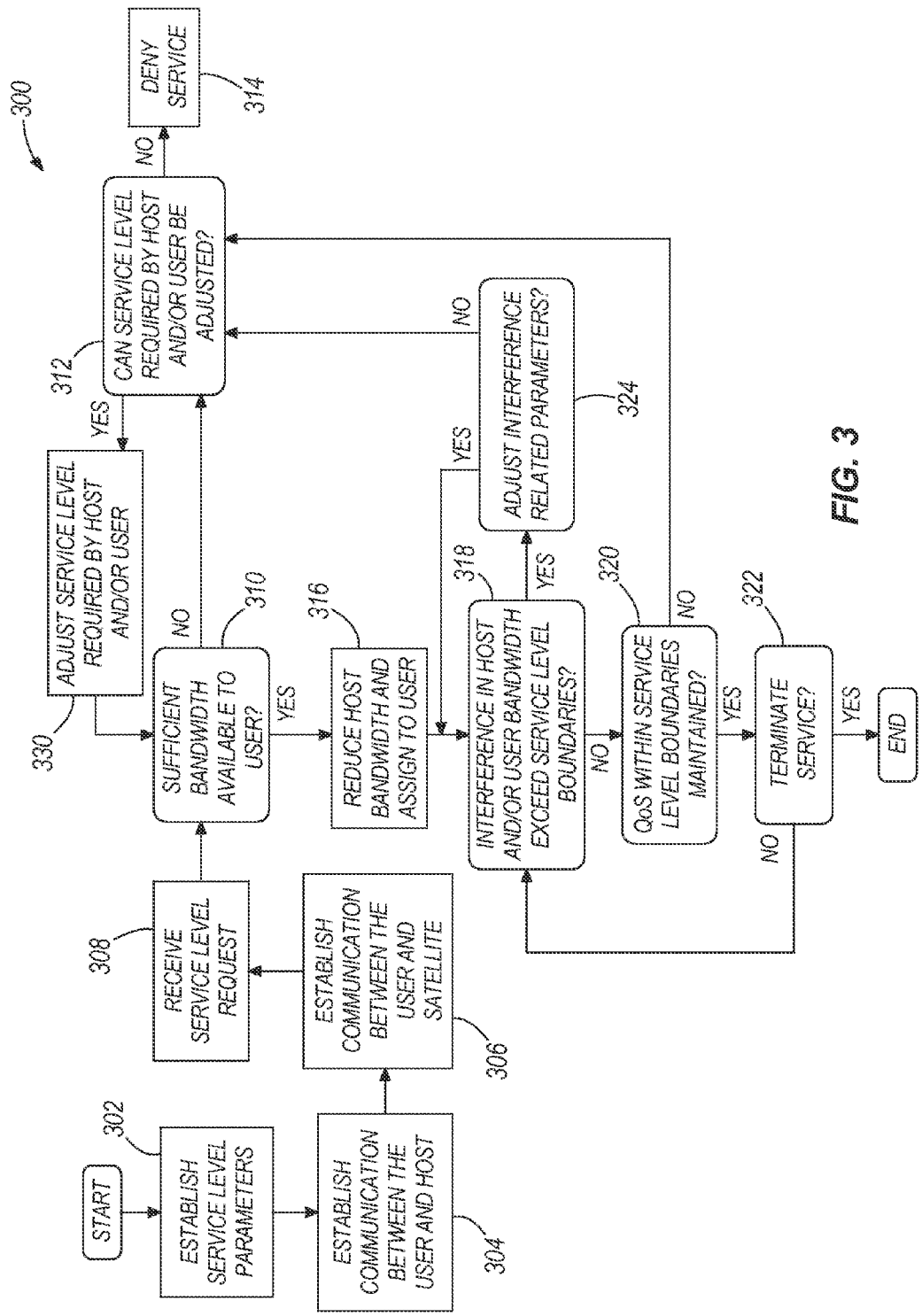
FIG. 3 is a flow chart of a dynamic service level allocation method.

FIG. 3 shows an example of a dynamic service level allocation method 300. Initially, service level parameters are established between the user and the host 302 ("user service level parameters"). These user service level parameters define the global parameters under which the user may request a specific service level instance. For example, these user service level parameters include the bandwidth and QoS levels (including, but not limited to, data rate, packet loss rate, jitter and latency) to be provided to the user and an acceptable level of interference in the user bandwidth. In addition, the user service level parameters may include the geographic area and time frame in which the service level will be provided, persistence of service, pricing schedules for services provided and may include guidelines for adjusting the user service level parameters. The user service level parameters are generally specified in terms of acceptable ranges. The parameters may be set forth in a service level agreement ("SLA") between the user and the host established prior to the provision of service.

Communications between the user and the host are established 304. Generally, this includes placing the user and host NOCs in communication with each other. This may be accomplished by placing the user NOC and host NOC in communication with a synchronization module. One way in which to accomplish this is by creating an interface between the user NOC and the synchronization module and creating an interface between the host NOC and the synchronization module.

Establishing communications between the user and the satellite 306 may be established via a modem dedicated to the user. This "user modem" may be installed in the host's teleport, in which case the modem receives a signal from the satellite at the IF level via the host's antenna. Alternately, the user modem may be installed in the user's teleport, in which case the modem receives the signal from the satellite at the IF level via the user's antenna. In each case, the user modem is controlled by the user's own NOC.

When the user requires service levels to be provided by the host, the host receives a request for a service level 308. The request for service level will generally set forth the bandwidth required by the user.

Figure 4:
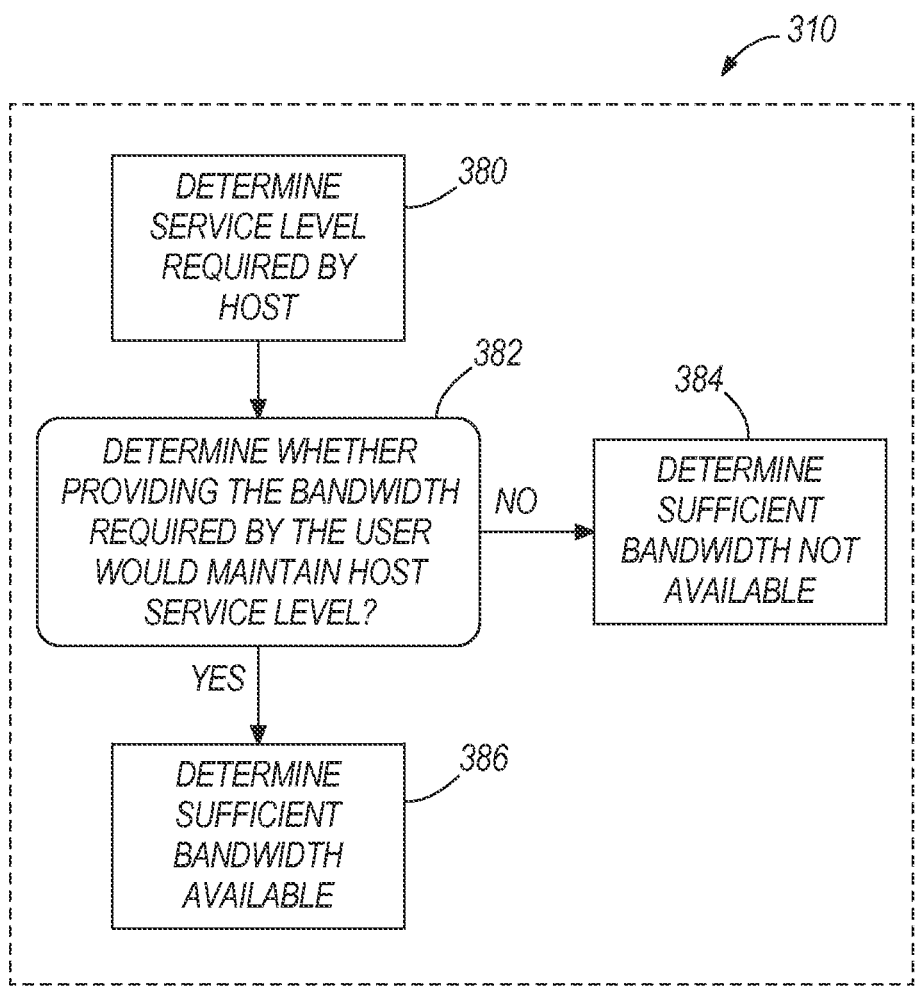
FIG. 4 is a flow chart of method for determining whether sufficient bandwidth is available to a user.

It is then determined whether the host has sufficient bandwidth available to meet the service level required by the user 310. As show in FIG. 4, determining whether there is sufficient bandwidth available to the user 310 includes, determining the service level required by the host 380 and determining whether providing the bandwidth required by the user (in other words, reducing the host bandwidth) would enable the service level required by the host to be maintained 382.

Determining the service level required by the host 380 includes examining the host's current and future requirements. The host's current requirements may include determining the host's current bandwidth and QoS. The host's current requirements may include load on and interference in the host bandwidth and data packing efficiency and size. These requirements may be measured to determine the host's current requirements. The host's future service level requirements may be predicted based on loading trends, seasonal sales data and service levels the host has agreed to provide to host customers ("host customer service level parameters"). The host customer service level parameters generally include minimum QoS levels and the conditions under which the host customer QoS levels may be altered. These parameters may be set forth in an SLA between the host and the customers.

Determining whether providing the bandwidth requested by the user would enable the host service level to be maintained 382 may include evaluating the reduced host bandwidth against the minimum service levels set forth in the host customer service level parameters for QoS level (such as, data rate, packet loss rate, and latency (TCP/IP window)). If reducing the host bandwidth by that required by the user would cause one or more of the host customers' QoS parameters to drop below the minimum, it is determined that sufficient bandwidth is not available to the user 384, In contrast, if reducing the host bandwidth by that required by the user would not cause one or more of the host customers' QoS parameters to drop below the minimum, it is determined that sufficient bandwidth is available to the user 386.

Referring to FIG. 3, if sufficient bandwidth is not available to the user 310, it is determined whether the service level requested by the user and/or the service level required by the host can be adjusted 312. If adjustments can be made 312, the service level requested by the user may be adjusted within a range set forth in the user service level parameters and according to the guidelines set forth in the user service level parameters 330. Adjustments to the host customer service level parameters may be made according to the conditions under which the host customer QoS levels may be adjusted as set forth in the host customer service level parameters 330.

After the adjustments are made 330, it is determined whether there is sufficient bandwidth available to the user 310 using the adjusted host customer service level parameters and/or the adjusted user service level requirements. If sufficient bandwidth is not available 310, the process of determining whether service level requirements can be adjusted 312, adjusting the service level requirements 330 and determining whether there is sufficient bandwidth available to the user 310 (a "negotiation process") are repeated until a condition is met. When this condition is met, service is provided. In another example, if this condition is not met, service may be denied 314. For example, if determining whether sufficient bandwidth is available to the user 310 does not converge on a solution in which sufficient bandwidth becomes available after a specified number of iterations or after a specified time period has passed, service may be denied to the user 314.

When the bandwidth sufficient to accommodate the service level required by the user becomes available 310, the bandwidth available to the host is reduced and the bandwidth required by the user is assigned to the user 316.

As service is provided to the user and host, the service provided to the user and host is periodically monitored to determine whether interference levels are in compliance with the user service level parameters and the host customer service level parameters 318. If the interference in the host and/or user bandwidths exceeds their respective service level parameters, interference related parameters, such as RF interactions, power control and sidelobe control are analyzed and adjusted 324 in an attempt to bring the interference in the host bandwidth and user bandwidth into compliance with their respective service level parameters. If the interference related parameters cannot be adjusted in a way to place the interference in compliance, the negotiation process may be performed.

Similarly the service provided to the user and the host is periodically monitored to determine whether QoS levels are in compliance with the service level required by the user and the service level required by the host 320. If the QoS levels in the host and/or user bandwidths is lower than defined in the host customer and/or user service level parameters, the QoS may be maintained at the lower level and the negotiation process may be performed.

In general, service levels will continue within the established parameters until the service provided to the user terminates 322. For example, the service provided to the user may expire under the terms of the user service level request or the user may communicate a request to terminate the service level.

Figure 5:
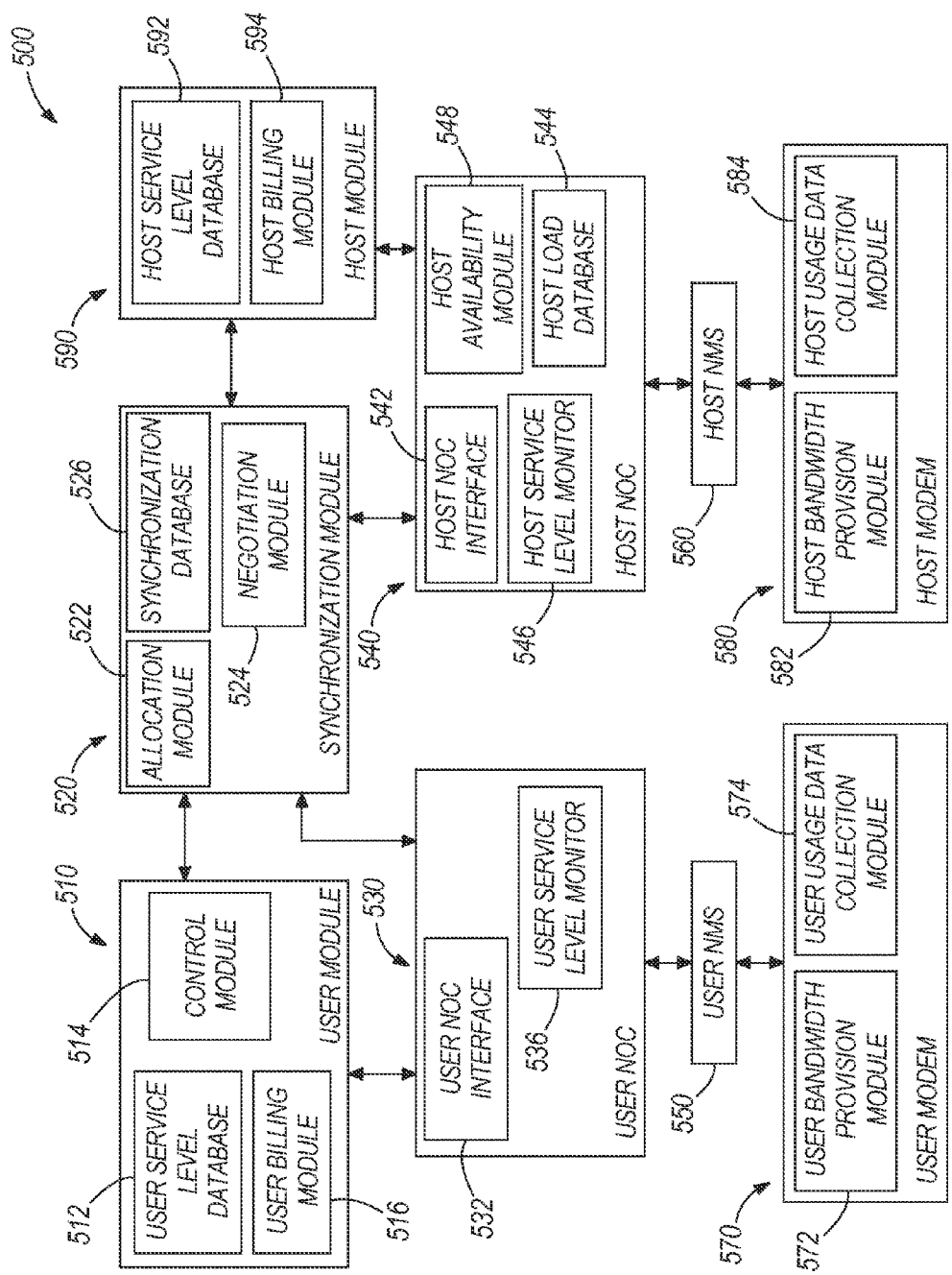
FIG. 5 is a functional block diagram of a dynamic service level allocation system.

A function block diagram of an exemplary DSLAS is shown in FIG. 5. The DSLAS 500 generally includes a user module 510, a synchronization module 520, a user NOC interface 532 and a host NOC interface 542. The DSLAS 500 may further include a user NOC 530, a host NOC 540, a user network management system ("NMS") 550, a host NMS 560, a user modem 570, a host modem 580 and a host module 590. The user module 510 is in communication with the synchronization module 520 and the user NOC 530. The synchronization module 520 is further in communication with the host module 590, the user NOC 530 via the user NOC interface 532 and the host NOC 540 via the host NOC interface 542. The user NOC 530 is in communication with the user modem 570 via the user NMS 550. The host NOC 540 is in communication with the host modem 580 via the host NMS 560. Communications among the elements of FIG. 5 may be accomplished by electromagnetic communications over one or more electromagnetic channels and/or networks using a variety of techniques and protocols.

In general, the geographic location of the components of the DSLAS 500 need not be fixed. For example, the user module 510, synchronization module 520, host module 590, user NOC interface 532 and host NOC interface 542 generally do not need to have a geographically fixed location with respect to the other components of the DSLAS 500. Further, the user 530 and host 540 NOCs may be located remotely from the user 550 and host 560 NMSs, respectively, and the user 570 and host 580 modems, respectively. While FIG. 5 shows the user NOC interface 532 located in the user NOC 520 and the host NOC interface 542 in the host NOC 530, this is merely an example.

The user module 510, synchronization module 520, host module 590, user NOC interface 532 and host NOC interface 542 may be implemented in hardware, computer-executable software or a combination of hardware and software. Each of these components may include or be in communication with one or more processors and/or computer-readable memory devices (not shown). The memory devices may include any type of fixed, removable or virtual digital storage device and, if needed, a device for reading the digital storage device. The processor may include any type of device or devices used to process digital information. The one or more processors and memory devices may be internal, external or remote to the user module 510, synchronization module 520, host module 590, user NOC interface 532 and host NOC interface 542 in any combination. The software may include object code, source code or any computer-readable code and may be stored in the one or more processors and/or memory devices in any combination.

The user module 510, synchronization module 520, host module 590, user NOC interface 532 and host NOC interface 542 and their respective elements may be implemented in separate components (including hardware and/or software). Alternatively, some or all may be implemented together in a one or more devices, such as a computer. Additionally or alternatively, some or all of the components may be on or in communication with a remote device, such as a server, memory or the like. For example, the synchronization module 520 and the host NOC 540 may be implemented in the same cloud-based system.

The host modem 580 and user modem 570 provide the bandwidth over which data is communicated in a satellite communication system (see FIG. 1 and FIG. 2). The host modem 580 includes a host bandwidth provision module 582 that provides bandwidth to the host according to instructions received from the host NOC 540 via the host NMS 560 as allocated by the synchronization module 520. The host NMS 560 generally provides real-time interface and control of the host modem 580. In addition, the host NMS 560 communicates information and instructions between the host modem 580 and the host NOC 540.

The host modem 580 also includes a host usage data collection module 584. The host usage data collection module 584 collects data relating to the use of the host bandwidth. For example, it may collect data relating to the load on the host bandwidth, the interference level in the host bandwidth and the QoS level (which may include data rate, packet loss rate, jitter and latency) provided in the host bandwidth.

The user modem 570 includes a user bandwidth provision module 572 that provides bandwidth to the user according to instructions received from the user NOC 530 via the user NMS 550 as allocated by the synchronization module 520. The user NMS 550 generally provides real-time interface and control of the user modem 570. In addition, the user NMS 550 communicates information and instructions between the host modem 570 and the user NOC 530.

The user modem 570 also includes a user usage data collection module 574. The user usage data collection module 574 collects data relating to the use of the user bandwidth. For example, it may collect data relating to the load on the user bandwidth, the interference level in the user bandwidth, and the QoS level provided in the user bandwidth.

The host system 590 generally includes a host service level database 592. The host service level database 592 stores information relating to the host customer service level parameters and may include seasonal sales data. As described in connection with FIG. 4, the service level required by the host is related to the host customer service level parameters.

The user system 510 generally includes a user service level database 512 and a control module 514. The user system database 512 includes the user service level parameters that establish the parameters under which the host will provide a service level to the user. These user service level parameters may include the bandwidth and QoS levels to be provided to the user, an acceptable level of interference in the user bandwidth, the geographic area and time frame in which the service level will be provided, persistence of service, pricing schedules for services and guidelines for adjusting the user service level parameters.

The control module 514 provides the interface between the user and the synchronization module 520. It may include a graphical user interface, which may include input and output systems (not shown). The input and output systems generally include any type of visual, manual, audio, electronic or electromagnetic device or devices capable of communicating information between a processor or memory and a person or other processor or memory. The input and output systems may be implemented together or separately.

When service level is desired by the user, the user instructs the control module 514 to generate a user request for service level that includes a bandwidth and QoS level required by the user. The requested service level is generally within the user service level parameters.

The synchronization module 520 includes an allocation module 522, a negotiation module 524 and a synchronization database 526. The host NOC 540 is in communication with the host module 590 and includes the host NOC interface 542 that is configured to place the host NOC 540 in communication with the synchronization module 520, a host availability module 548, a host service level monitor 546 and a host load database 544. The host load database 544 stores load data received from the host modem 580 and may use the load data to generate predictions of future loads (loading trends). The host service level monitor 546 stores information received from the host modem 580 relating to interference levels, QoS levels and/or other information relating to the services used and/or provided by the host in the host bandwidth.

Upon receiving the service level request from the control module 514, the allocation module 522 communicates a request for the host NOC 540 to reduce the bandwidth allocated to the host by the amount of bandwidth required by the user. The host availability module 548 determines whether the reduced bandwidth would be sufficient to maintain the level of service required by the host by determining the level of service required by the host and whether the reduced bandwidth could accommodate the level of service required by the host. To determine the service level required by the host, the host availability module 548 evaluates the loading data stored in the host load database 544, the QoS level (including, but not limited to data rate, packet loss rate, jitter and latency), packing efficiency, packet size, and interference data stored in the host service level monitor 546 and also, the host customer service level parameters stored in the host service level database module 592.

The host availability module 548 determines whether the reduced bandwidth would lower the QoS level provided to the host customers below the minimum required by the host customer service level parameters. If the host customers minimum QoS level could not be maintained, the host availability module 548 may deny the request to reduce the host bandwidth.

If the host availability module 548 denies the request to reduce the host bandwidth, it communicates the denial along with other information, such as modulation modes, data rates, coding rates and data rate margin to the negotiation module 524.

In order to find conditions under which the host can provide the bandwidth required by the user while maintaining the service level required by the host, a negotiation process is initiated. In this negotiation process, the negotiation module 524 uses the information communicated by the host availability module 548, the host customer minimum service level parameters from host service level database 592 and the guidelines for adjusting the user service level parameters from the control module 514 to adjust the bandwidth requested by the user and/or the service level required by the host. The negotiation module 524 makes the adjustments in a manner designed to lower one or more of the host customer minimum QoS parameters, lower the bandwidth required by the user and/or improve the QoS provided to the host customers at a lower host bandwidth. For example, the negotiation module 524 may make adjustments that lower or eliminate the data rate margin. If the negotiation module 524 cannot make such adjustments, service may be denied to the user. If the negotiation module 524 can make such adjustments, the adjustments may be made and stored in the synchronization database 526.

Based on the revised user bandwidth requirement and/or host customer minimum service level parameters, the allocation module 522 communicates a revised request for bandwidth reduction to the host availability module 548 via the host NOC interface 542. The host availability module 548 again determines whether the reduced host bandwidth can accommodate the service level required by the host. If the host NOC 532 determines again that the reduced host bandwidth cannot accommodate the service level required by the host, the negotiation process may repeat. The negotiation process will generally continue until, for example, the negotiation module 524 determines that no adjustments can be made, the host availability module 548 determines that the reduced host bandwidth is sufficient to accommodate the service level required by the host or the adjustments being made fail to converge sufficiently on a bandwidth reduction request that would accommodate the host service level requirements. For example, this convergence may be determined by examining the rate at which the data rate margin approaches an acceptable level. If no further adjustments can be made or the adjustments being made fail to converge sufficiently on a bandwidth reduction request that would accommodate the host service level requirements, service to the user may be denied.

When the host availability module 548 determines that the reduced host bandwidth is sufficient to maintain the service level required by the host, this determination is communicated to the allocation module 522 and the host NOC 540 instructs the host modem 580 to reduce the host bandwidth by the amount required by the user. The allocation module 522 requests the user NOC 530 to instruct the user modem 570 to allocate the bandwidth required by the user to the user.

After the host bandwidth is reduced and bandwidth is provided to the user, the user may control it's use of the bandwidth via the control module 514. For this and/or other reasons, the user may exceed the user service level parameters. In addition, host usage of it's bandwidth may cause the QoS provided to the user to drop below the service level parameters. For these reasons and due to the dynamic nature of sharing bandwidth under the DSLAS 500, the DSLAS 500 dynamically monitors the bandwidth, QoS, interference and other service levels provided to the host and user. Information relating to these parameters is measured by or communicated through the host usage data collection module 584 in the host modem 580 and/or the user usage data collection module 574 in the user modem 570. The host and user data collection monitors 584 and 574, respectively, communicate the usage information to the host and user service level monitors 546 and 536, respectively.

For example, if the user service level monitor 536 of the user NOC 530 determines that the level of interference is outside user service level parameters, it will adjust factors such as RF interactions, power control and sidelobe control to bring the level of interference back within the user service level parameters. However, if the user service level monitor 536 fails to bring the level of interference back within the user service level parameters, it communicates this failure and other data with the synchronization module 520 and the negotiation process is initiated in order to find adjustments to the user and/or host service level requirements that will satisfy the interference level requirements.

Similarly, if the host service level monitor 546 of the host NOC 540 determines that the level of interference is outside the host customer service level parameters, it will adjust factors such as RF interactions, power control and sidelobe control to bring the level of interference back within the host customer service level parameters. However, if the host service level monitor 546 is unable to bring the level of interference back within the host customer service level parameters, it communicates this failure and other data with the synchronization module 520 and the negotiation process is initiated in order to find adjustments to the user and/or host customer service level requirements that will satisfy the interference level requirements.

In another example, if the user service level monitor 536 determines that the QoS level in the user bandwidth is outside the user service level parameters, the user service level monitor 536 will communicate this deviation to the synchronization module 520 and the negotiation process will be initiated in order to find adjustments to the user and/or host service level requirements that will satisfy the user QoS level requirements. Similarly, if the host service level monitor 546 determines that the host QoS level in the host bandwidth is outside the host customer service level parameters, it will communicate this deviation to the synchronization module 520 and the negotiation process will be initiated in order to find adjustments to the user and/or host service level requirements that will satisfy the QoS level requirements.

The user module 510 may further include a user billing module 516. The user billing module 516 may determine the cost to the user for the services used and/or provided according to a cost schedule stored in the user service level database 512. For example, the billing may be based on the user's service level usage. In another example, the user billing module 516 may adjust the cost to the user based on changes made to the user service level requirements during the negotiation process. Such cost adjustment information may be obtained from the control module 514.

The host module 590 may further include a host billing module 594. The host billing module 594 may determine the cost to the host customers for the services used and/or provided according to a cost schedule stored in the host service level database 592. The host service level database 592 provides a cost schedule and tracks billing for each customer. For example, the billing may be based on a host customer's service level usage. In some cases, the billing module 594 may adjust the cost to a customer based on adjustments made to the customer's minimum service level requirements during a negotiation process. For example, the host may compensate or reimburse the customer for providing below minimum service levels.

The examples described herein of a DSLAS have been in the context of implementing a DSLAS within a single beam or cell of a satellite. However, the DSLAS would also work in a satellite system that produces multiple beams. One such system would include multiple satellites each providing one beam. Another such system would include one or more multi-beam satellites.

DSLAS may be implemented in a multibeam satellite system in much the same way as in a single beam system. Allocation of host bandwidth is accomplished using the systems and methods set forth herein on a cell-by-cell basis. For example, a user can establish a service level with a host in a first cell and as that user moves to a second cell, the user can establish a service level in the second cell in the same manner as was done in the first cell.

While various embodiments of the invention have been described, it will be apparent to those of ordinary skill in the art that other embodiments and implementations are possible within the scope of the invention. Accordingly, the invention is not to be restricted except in light of the attached claims and their equivalents.

The invention claimed is:

1. A system for dynamically allocating bandwidth allocated to a host for communication with a satellite to a user according to service level parameters comprising:
    a control module configured to generate a user service level request comprising a bandwidth required by a user;
    a host comprising a host network operations center ("NOC");
    a synchronization module in communication with the control module comprising:
        an allocation module configured to create a user request to reduce a bandwidth allocated to the host by the bandwidth required by the user; and
        a negotiation module configured to adjust the user service level request or a service level required by the host according to service level parameters when the host NOC determines the service level required by the host cannot be maintained if the user request to reduce the bandwidth allocated to the host is granted.

2. The system of claim 1 further comprising a user NOC, wherein the allocation module is further configured to communicate the user request to reduce the bandwidth allocated to the host as adjusted by the negotiation module to the user NOC.

3. The system of claim 1 further comprising a user NOC, wherein the negotiation module is further configured to adjust the user service level request or the service level required by the host according to the service level parameters when the user NOC determines that an interference level in the bandwidth required by the user is not within the service level parameters.

4. The system of claim 1 further comprising a user NOC, wherein the negotiation module is further configured to adjust the user service level request or the service level required by the host according to the service level parameters when the user NOC determines that a quality of service ("QoS") level in the bandwidth required by the user is not within the service level parameters.

5. The system of claim 1 further comprising a billing module configured to determine a cost to the user for providing the bandwidth required by the user to the user according to the service level parameters.

6. The system of claim 1 further comprising the satellite, wherein the satellite is a multi-beam satellite defining a plurality of cells and the system allocates the bandwidth allocated to the host to the user on a cell-by-cell basis.

7. The system of claim 1 further comprising a host NOC interface configured to place the synchronization module in communication with the host NOC, wherein the host NOC is configured to determine whether the service level required by the host can be maintained if the user request to reduce the bandwidth allocated to the host is granted, and to instruct a host modem to reduce the bandwidth allocated to the host by the bandwidth required by the user when the host NOC determines the service level required by the host can be maintained if the user request to reduce the bandwidth allocated to the host is granted.

8. The system of claim 1 further comprising a user NOC interface, a user NOC, and a user modem, the user NOC interface configured to place the user NOC in communication with the synchronization module and instruct the user modem to provide the bandwidth required by the user to the user when the host NOC determines the service level required by the host can be maintained if the user request to reduce the bandwidth allocated to the host is granted.

9. A system for dynamically allocating bandwidth allocated to a host for communication with a satellite to a user according to user service level parameters comprising:
a host modem configured to provide bandwidth to a host;
a user modem configured to provide bandwidth to a user;
a user control module configured to generate a user service request that includes a bandwidth required by the user;
a synchronization module in communication with the user control module and configured to create a user request to reduce the bandwidth allocated to the host by the bandwidth required by the user;
a host network operations center (NOC) in communication with the synchronization module and the host modem, wherein the host NOC is configured to determine whether a service level required by the host can be maintained if the user request to reduce the bandwidth allocated to the host is granted, and to instruct the host modem to reduce the bandwidth allocated to the host by the bandwidth required by the user when the host NOC determines the service level required by the host can be maintained if the user request to reduce the bandwidth allocated to the host is granted.

10. The system of claim 9 further comprising a negotiation module and a user NOC, wherein the synchronization module is further configured to communicate the user request to reduce the bandwidth allocated to the host as adjusted by the negotiation module to the user NOC.

11. The system of claim 9, wherein the host modem includes a host service level collection module configured to communicate service levels provided to the host to the host NOC, wherein the service levels provided to the host include a host QoS level and a host interference level.

12. The system of claim 11, wherein the service level required by the host includes a host interference level parameter or a host QoS level parameter and the host NOC includes a host service level monitor configured to determine whether the service levels provided to the host are within the host interference level parameter or the QoS level parameter.

13. The system of claim 9 further comprising a user NOC, wherein the user modem includes a user service level collection module configured to communicate service levels provided to the user to the user NOC, wherein the service levels provided to the user include a user QoS level and a user interference level.

14. The system of claim 13, wherein a service level required by the user includes a user interference level parameter or a user QoS level parameter and the user NOC includes a user service level monitor configured to determine whether the service levels provided to the user are within the user interference level parameter or the QoS level parameter.

15. The system of claim 9 further comprising a billing module, wherein the billing module is configured to bill the user for bandwidth allocated to or service used by the user.

16. The system of claim 9 further comprising a host billing module, the host billing module in communication with the synchronization module and configured to bill a customer of the host for bandwidth allocated to or service used by the customer.

17. The system of claim 16, wherein the host billing module is further configured to enable the host to reimburse the customer for services used by the customer that did not meet a minimum level of service.

18. The system of claim 9 further comprising a host teleport, wherein the host modem is in communication with the host teleport.

19. The system of claim 9 further comprising a host teleport, wherein the user modem is in communication with the host teleport.

20. The system of claim 9 further comprising a user teleport, wherein the user modem is in communication with the user teleport.

21. The system of claim 9 further comprising the satellite, wherein the satellite is a multi-beam satellite defining one or more cells and the synchronization module allocates the bandwidth allocated to the host to the user on a cell-by-cell basis.

22. The system of claim 9 further comprising a user service database configured to store user service level parameters.

23. The system of claim 9 further comprising a host service level database configured to store host service level parameters.

24. The system of claim 9 wherein the synchronization module is configured to adjust a service level requested by the user or the service level required by the host according to user and host service level parameters when the host NOC determines the service level required by the host cannot be maintained if the user request to reduce the bandwidth allocated to the host is granted.

25. The system of claim 9 further comprising a user NOC in communication with the synchronization module and the user modem, wherein the user NOC is configured to instruct the user modem to provide the bandwidth required by the user to the user when the host NOC determines the service level required by the host can be maintained if the user request to reduce the bandwidth allocated to the host is granted.

26. A method for dynamically allocating bandwidth allocated to a host for communicating with a satellite to a user comprising:
receiving a user service level request that includes a bandwidth required by a user;
determining whether sufficient bandwidth, within the bandwidth allocated to a host, is available to the user to accommodate the user service level request and maintain a service level required by the host including:
determining the service level required by the host; and determining whether allocating the bandwidth required by the user to the user would maintain the service level required by the host;

reducing the bandwidth allocated to the host by the bandwidth required by the user and allocating the bandwidth required by the user to the user if sufficient bandwidth is available to the user;

adjusting the user service level request or the service level required by the host according to service level parameters if sufficient bandwidth is not available to the user; and monitoring a service level provided by the host to the user and adjusting the user service level request or the service level required by the host if a service level provided to the user is not within the service level parameters.

27. The method of claim 26 further comprising monitoring a service level provided to the host and adjusting the service level required by the host if the service level provided to the host is not within the service level parameters.

28. The method of claim 26 further comprising billing the user for the bandwidth allocated to or service used by the user.

29. The method of claim 26 further comprising communicating with a user via a satellite comprising a multi-beam satellite defining one or more cells, and allocating the bandwidth allocated to the host to the user on a cell-by-cell basis.

30. A method for dynamically allocating bandwidth allocated to a host for communicating with a satellite to a user comprising:

receiving a user service level request that includes a bandwidth required by a user;

determining whether sufficient bandwidth, within the bandwidth allocated to a host, is available to the user to accommodate the user service level request and maintain a service level required by the host including:
determining the service level required by the host; and
determining whether allocating the bandwidth required by the user to the user would maintain the service level required by the host;

reducing the bandwidth allocated to the host by the bandwidth required by the user and allocating the bandwidth required by the user to the user if sufficient bandwidth is available to the user;

adjusting the user service level request or the service level required by the host according to service level parameters if sufficient bandwidth is not available to the user; and monitoring a service level provided to the host and adjusting the service level required by the host if the service level provided to the host is not within the service level parameters.

\* \* \* \* \*